(12) United States Patent
Battula et al.

(10) Patent No.: US 8,392,300 B1
(45) Date of Patent: Mar. 5, 2013

(54) METHOD AND SYSTEM FOR TRANSFERRING BILL PAYMENT DATA

(75) Inventors: Raghunath Battula, Sunnyvale, CA (US); Charles Richard Honton, Cleveland Heights, OH (US); Donald Victor Ius, Provo, UT (US); Nagananda Addagadde, Parma Heights, OH (US); Carson Page Benson, Orem, UT (US); Scott William Paxman, Lindon, UT (US)

(73) Assignee: Intuit Inc., Mountain View, CA (US)

(*) Notice: Subject to any disclaimer, the term of this patent is extended or adjusted under 35 U.S.C. 154(b) by 856 days.

(21) Appl. No.: 12/277,474

(22) Filed: Nov. 25, 2008

(51) Int. Cl.
*G06Q 40/00* (2012.01)
(52) U.S. Cl. ............... 705/35; 705/19; 705/80; 705/39; 705/26.1
(58) Field of Classification Search ............. 705/30–45, 705/19, 26.1, 80
See application file for complete search history.

(56) References Cited

U.S. PATENT DOCUMENTS

| | | | | |
|---|---|---|---|---|
| 7,107,243 B1* | 9/2006 | McDonald et al. | ............. | 705/40 |
| 7,395,241 B1* | 7/2008 | Cook et al. | ............. | 705/42 |
| 7,848,974 B1* | 12/2010 | Sheehan | ............. | 705/35 |
| 8,121,947 B1* | 2/2012 | Barth et al. | ............. | 705/40 |
| 2005/0021456 A1* | 1/2005 | Steele et al. | ............. | 705/39 |
| 2006/0086783 A1* | 4/2006 | Tredeau et al. | ............. | 235/379 |
| 2006/0116949 A1* | 6/2006 | Wehunt et al. | ............. | 705/35 |
| 2007/0100749 A1* | 5/2007 | Bachu et al. | ............. | 705/42 |
| 2007/0130065 A1* | 6/2007 | Staab et al. | ............. | 705/39 |
| 2008/0065520 A1* | 3/2008 | Hazlehurst et al. | ............. | 705/35 |
| 2008/0109279 A1* | 5/2008 | Csoka | ............. | 705/7 |
| 2010/0094740 A1* | 4/2010 | Richter | ............. | 705/35 |

* cited by examiner

*Primary Examiner* — Tien Nguyen
(74) *Attorney, Agent, or Firm* — McKay and Hodgson, LLP; Philip McKay; Sean P. Lewis

(57) ABSTRACT

A system and method for transferring bill payment data whereby a user identifies their current financial institution and provides authentication data associated with their current online account system. The current online account system is then accessed using the user provided current online account system authentication data and data associated with a bill payment feature, and/or recurring bill payment feature, of the current online account system is obtained and/or copied, in one example using screen scraping technology. The data associated with the bill payment feature, and/or recurring bill payment feature, of the current online account system is displayed to the user and the user is provided the opportunity to select what portions of the data are to be transferred to a bill payment feature, and/or recurring bill payment feature, of the a new online account system. The selected data then transferred to the bill payment feature, and/or recurring bill payment feature, of the new online account system.

21 Claims, 7 Drawing Sheets

QuickSwitch™
by Digital Insight an Intuit Company

It's easy to switch your payees

This wizard helps you switch your current Bill Payees over to Financial Institution of East Coast with less hassle than entering everything in by hand.
In just a few minutes you will:

1. Access your old account
   Enter your login information from your old account to access your Bill Payees.

2. Switch Bill Payees
   Select the payees you want to switch to Financial Institution of East Coast and authorize the transfer.

3. Review
   Review the switched payees.

4. Next Steps
   See what you need to do to start making payments and to switch your direct deposits to Financial Institution of East Coast.

🔒 It's safe and secure
Financial Institution of East Coast protects and safeguards your financial data.

? Frequently Asked Questions

Start Here!
Enter the name of the financial institution you want to switch Bill Payees FROM:

[_____] [Go]   301

? Why isn't my financial institution on the list?

Close

Privacy
Customer Service (800)234-5678

QuickSwitch™
by Digital Insight an Intuit Company

① ⇨ ② ⇨ ③ ⇨ ④
Access your old account   Switch Bill Payees   Review   Next Steps

⸺

Enter Login Information
Enter your Customer Central Bank login information to access your bill payees. If this is not your bank, go back and select a new institution.

? Frequently Asked Questions

? Why do I need to enter my login information?

Banking User ID: [____]
Banking Password: [____]  401
Re-enter Banking Password: [____]

⸺

[Cancel] [Continue]

Privacy
Customer Service (800)234-5678

QuickSwitch™
by Digital Insight an Intuit Company

① ⇨ ② ⇨ ③ ⇨ ④

Access your old account    Switch Bill Payees    Review    Next Steps

Payee Information

This payee information is gathered from Customer Central Bank. Provide any missing information and click continue.    ⑦ Frequently Asked Questions

*Name: [Acme Gym Membership]
*Nickname: [Acme Gym]
Masked Account Number: xxx-xxx-9876    601
*Account Number: [1122-3344-9876]    ⑦ When do I need an account number?
☐ Payee does not use account numbers
*Address: [PO Box 998811]
Address Line 2: [ ]
*City: [Los Angeles]
*State: [CA]
*Zip: [19905]-[ ]
Phone Number: [800-154-4842] (NNN-NNN-NNNN)
*Denotes required field

[Cancel]    [Continue]

QuickSwitch™
by Digital Insight an Intuit Company

① ⇨ ② ⇨ ③ ⇨ ④
Access your old account    Switch Bill Payees    Review    Next Steps

---

Review

3 of 5 bill payees switched

Congratulations, you have successfully switched the Bill Payees below to Financial Institution of East Coast! Payments will need to be stopped at Customer Central Bank. Click to see each old Customer Central Bank and new Financial Institution of East Coast Payee in more detail.

⊙ Frequently Asked Questions
🖶 Print

| | Name | Nickname | Account Number | Last Payment | Last Payment Date |
|---|---|---|---|---|---|
| ⚠ Duplicate Payee | | | | | |
| Switched | YMCA Membership | Birthday gift | | $78.98 | Jan 27, 2008 |
| ☐ 703 | Illuminating Company | Lights | x5432 | $110.97 | Jan 27, 2008 |
| Switched 705 | Columbia Gas | Gas | x1234 | $110.97 | Jan 27, 2008 |
| Switched | AT&T | Phone | x5432 | $110.97 | Jan 27, 2008 |
| Switched | US Bank Credit card | USB | x5432 | | |

701

[Switch Selected]

METHOD AND SYSTEM FOR TRANSFERRING BILL PAYMENT DATA

BACKGROUND

Over the past decade, online account systems, and/or other forms of computing system implemented account systems, have enjoyed a tremendous increase in popularity. Indeed, it is relatively clear that, very soon, at least in the United States, online account systems will become the standard source of account information, and the preferred platform/mechanism for performing financial transactions. Online account systems are associated with many forms of Financial Institutions. The most familiar are Banks, Savings & Loans, Building Societies, Credit Unions, Credit Card Companies, Stock Brokerages, Asset Account Firms, and Investment Firms.

Currently, online account systems allow the user to, among other things, check account balances, electronically track individual financial transactions, balance checkbooks/checking accounts, track expenditures, and create and manage budgets. In addition, one very popular capability of currently available online account systems is a bill pay feature that gives the user the ability to pay bills through the online account system, and thereby eliminates the need to write/print traditional paper checks, mail the traditional paper checks, and then wait for the traditional paper checks to be processed by the payee and/or clear the user's account.

Using a typical online account system bill pay feature, the user must first manually enter payee information for each payee, such as, but not limited to: the payee name; the payee address; the users account number with the payee; and, often, a user nickname for the payee, through a user interface screen and using a user interface device. Taking the time to enter this payee information can be quite burdensome, especially for users having multiple payees. However, in many cases, once the payee information is manually entered a first time, the payee information is then saved and automatically, or semi-automatically, applied for each future payment to that payee, typically by the user selecting the payee name, or nickname for the payee, from a list of payee names, or nicknames for payees.

Some online account systems also provide a recurring bill payment feature whereby, not only is the user spared the burden of manually entering the payee information for each payment to a given payee, but the user is also provided the opportunity to designate an amount of payment and a frequency of payment to be automatically applied. Consequently, using online account systems having this recurring bill payment feature, the user need only enter the data associated with a recurring payment, including, but not limited to, the payee name, the payee address, the user's account number with the payee, a user nickname for the payee, the amount of payment to be made to the payee, and the frequency of payment to the payee, a single time. Then a payment to the payee is automatically made at the indicated frequency, without any further input from the user.

As discussed above, the bill pay, and/or recurring bill pay, features of currently available online account systems represent significant convenience to the user. In addition, using the bill pay, and/or recurring bill pay, features of currently available online account systems there is less opportunity for the introduction of error because there is less manual data entry. Consequently, there is little doubt that the bill pay, and/or recurring bill pay, features of currently available online account systems are a valuable tool for users and a highly marketable feature for the financial institutions, such as banks, providing the online account system.

Indeed, the fact that, once the initial manual data entry is performed, the bill pay, and/or recurring bill pay, features of currently available online account systems are so convenient to the user often serves to keep the user tied to a given online account system, and financial institution, even when the user's needs would clearly be better served by changing financial institutions. This is because the prospect of manually entering all the payee and recurring payment information again for the new financial institution's online account system is viewed by many users as too daunting, tedious, and time consuming a task. Consequently, despite knowing it would be to their benefit to switch financial intuitions, many users stay with a current financial institution simply to avoid this data entry burden. As result, many financial institutions effectively hold users hostage using the users' own data, and the considerable inertia of convenience.

SUMMARY

In accordance with one embodiment, a system and method for transferring bill payment data includes a process for transferring bill payment data whereby a user can transfer bill payment, and/or recurring bill payment, data from their current financial institution to a new financial institution without having to manually enter all the payee and/or recurring payment information for the new financial institution. In one embodiment, a user first identifies their current financial institution and provides authentication data associated with their current online account system. In one embodiment, the process for transferring bill payment data then accesses the current online account system using the user provided current online account system authentication data. In one embodiment, once the current online account system is accessed, data associated with the bill payment feature, and/or recurring bill payment feature, of the current online account system is obtained and/or copied, in one embodiment using screen scraping technology. In one embodiment, the data associated with the bill payment feature, and/or recurring bill payment feature, of the current online account system is displayed to the user and the user is provided the opportunity to select what portions of the data associated with the bill payment feature, and/or recurring bill payment feature, of the current online account system are to be transferred to a bill payment feature, and/or recurring bill payment feature, of the a new online account system sponsored, provided, and/or otherwise associated with the new financial institution. In one embodiment, the user is also provided the opportunity to edit and/or change the data associated with the bill payment feature, and/or recurring bill payment feature, of the current online account system that is to be transferred to the new bill payment feature, and/or recurring bill payment feature, of the new online account system. In one embodiment, the selected and/or edited data associated with the bill payment feature, and/or recurring bill payment feature, of the current online account system is then transferred to the bill payment feature, and/or recurring bill payment feature, of the new online account system. In one embodiment, the user is also provided the opportunity to select a date when recurring payments made through the recurring bill payment feature of the current online account system are to be terminated and/or taken over by the recurring bill payment feature of the new online account system.

In one embodiment, a user identifies their current financial institution, herein also referred to as a source financial institution, which sponsors, provides, and/or is otherwise associated with, a source online account system having a source bill pay and/or recurring bill pay feature to the process for transferring bill payment data. In one embodiment, the user identifies the source financial institution through a user interface screen displayed on a display device associated with a computing system and a user interface device such as a mouse, a keyboard, a touch screen, voice recognition software, or any other device and/or system for converting one or more user actions into computing system based instructions as discussed herein, and/or as known in the art at the time of filing, and/or as developed after the time of filing.

In one embodiment, the user provides source online account system authentication data associated with the source online account system such as, but not limited to, a user ID, a user password, answers to multi-factor authentication questions and/or a user account number, to the process for transferring bill payment data. In one embodiment, the user provides the source online account system authentication data associated with the source online account system through a user interface screen displayed on a display device associated with a computing system and a user interface device such as a mouse, a keyboard, a touch screen, voice recognition software, or any other device and/or system for converting one or more user actions into computing system based instructions as discussed herein, and/or as known in the art at the time of filing, and/or as developed after the time of filing.

In one embodiment, the process for transferring bill payment data then accesses the source online account system using the user provided source online account system authentication data. In one embodiment, the process for transferring bill payment data accesses the source online account system using the user provided source online account system authentication data without the explicit permission, and/or knowledge of, the source financial institution. In one embodiment, the process for transferring bill payment data accesses the source online account system using the user provided source online account system authentication data with the explicit permission, and/or knowledge of, the source financial institution.

In one embodiment, once the source online account system is accessed, data associated with the source bill payment feature, and/or recurring bill payment feature, of the source online account system, is obtained and/or copied by the process for transferring bill payment data. In one embodiment, the data associated with the source bill payment feature, and/or recurring bill payment feature, of the source online account system, includes, but is not limited to: one or more payee names; the payee addresses associated with the one or more payees; the user's account numbers associated with the one or more payees; user nicknames associated with the one or more payees; recurring payment amounts, if any, associated with the one or more payees; recurring payment frequencies, if any, associated with the one or more payees; and beginning and ending dates for recurring payment plans, if any, associated with the one or more payees.

In one embodiment, the data associated with the source bill payment feature, and/or recurring bill payment feature, of the source online account system is obtained by the process for transferring bill payment data with the explicit permission, and/or knowledge of, the source financial institution. In one embodiment, the data associated with the source bill payment feature, and/or recurring bill payment feature, of the source online account system is obtained by the process for transferring bill payment data without the explicit permission, and/or knowledge of, the source financial institution. In one embodiment, the data associated with the source bill payment feature, and/or recurring bill payment feature, of the source online account system is obtained by the process for transferring bill payment data using screen scraping technology and/or any similar technology as discussed herein, and/or known in the art at the time of filing, and/or as developed after the time of filing.

In one embodiment, the data associated with the source bill payment feature, and/or recurring bill payment feature, of the source online account system is displayed to the user by the process for transferring bill payment data on a user interface screen displayed on a display device associated with a computing system. In one embodiment, the data associated with the source bill payment feature, and/or recurring bill payment feature, of the source online account system is displayed to the user as a listing of bill payment payees and the associated payees' information and/or associated recurring payments.

In one embodiment, the user is provided the opportunity to select what portions of the data associated with the source bill payment feature, and/or recurring bill payment feature, of the source online account system are to be transferred to a destination bill payment feature, and/or recurring bill payment feature, of a destination online account system sponsored, provided, and/or otherwise associated with the destination financial institution. In one embodiment, the user individually selects, or unselects, which bill payment payees and the associated payees' information and/or associated recurring payments are to be transferred from a listing of bill payment payees and the associated payee information and/or associated recurring payments. In one embodiment, the user selects what portions of the data associated with the source bill payment feature, and/or recurring bill payment feature, of the source online account system are to be transferred through a user interface screen displayed on a display device associated with a computing system and a user interface device such as a mouse, a keyboard, a touch screen, voice recognition software, or any other device and/or system for converting one or more user actions into computing system based instructions as discussed herein, and/or as known in the art at the time of filing, and/or as developed after the time of filing.

In one embodiment, the user is also provided the opportunity to edit and/or change the data associated with the source bill payment feature, and/or recurring bill payment feature, of the source online account system that is to be transferred to the destination bill payment feature, and/or recurring bill payment feature, of the destination online account system. In one embodiment, the user edits and/or changes the data associated with the source bill payment feature, and/or recurring bill payment feature, of the source online account system that is to be transferred to the destination bill payment feature, and/or recurring bill payment feature, of the destination online account system through a user interface screen displayed on a display device associated with a computing system and a user interface device such as a mouse, a keyboard, a touch screen, voice recognition software, or any other device and/or system for converting one or more user actions into computing system based instructions as discussed herein, and/or as known in the art at the time of filing, and/or as developed after the time of filing.

In one embodiment, the user selected and/or edited data associated with the source bill payment feature, and/or recurring bill payment feature, of the source online account system is then transferred to the destination bill payment feature, and/or recurring bill payment feature, of the destination online account system.

In one embodiment, the user selected and/or edited data associated with the source bill payment feature, and/or recurring bill payment feature, of the source online account system is transferred to the destination bill payment feature, and/or recurring bill payment feature, of the destination online account system with the explicit permission, and/or knowledge of, the destination financial institution. In one embodiment, the user selected and/or edited data associated with the source bill payment feature, and/or recurring bill payment feature, of the source online account system is transferred to the destination bill payment feature, and/or recurring bill payment feature, of the destination online account system without the explicit permission, and/or knowledge of, the destination financial institution.

In one embodiment, at least part of the user selected and/or edited data associated with the source bill payment feature, and/or recurring bill payment feature, of the source online account system is transferred to the destination bill payment feature, and/or recurring bill payment feature, of the destination online account system through the use of any database, computing system, and/or a server system, or any web-site or other web-based system, and/or using a computer program product as discussed herein.

In one embodiment, at least part of the user selected and/or edited data associated with the source bill payment feature, and/or recurring bill payment feature, of the source online account system is transferred to the destination bill payment feature, and/or recurring bill payment feature, of the destination online account system via an Internet connection.

In one embodiment, at least part of the user selected and/or edited data associated with the source bill payment feature, and/or recurring bill payment feature, of the source online account system is transferred to the destination bill payment feature, and/or recurring bill payment feature, of the destination online account system through any network of computing systems and/or server systems that is comprised of multiple different computers, wireless devices, cellular telephones, digital telephones, two-way pagers, personal digital assistants, server computers, or any desired combination of these devices, that are interconnected using a network.

In one embodiment, at least part of the user selected and/or edited data associated with the source bill payment feature, and/or recurring bill payment feature, of the source online account system is transferred to the destination bill payment feature, and/or recurring bill payment feature, of the destination online account system through e-mail or through text messaging.

In one embodiment, at least part of the user selected and/or edited data associated with the source bill payment feature, and/or recurring bill payment feature, of the source online account system is transferred to the destination bill payment feature, and/or recurring bill payment feature, of the destination online account system using any method, apparatus, process or mechanism for obtaining data, and/or for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, the user is provided the opportunity to select a date when the recurring payments made through the source recurring bill payment feature of the source online account system are to be terminated. In one embodiment, the user is provided the opportunity to select a date when the recurring payments to be made through the destination recurring bill payment feature of the destination online account system are to begin. In one embodiment, as a default, the recurring payments made through the source recurring bill payment feature of the source online account system are left in place until explicitly terminated by the user and the recurring payments to be made through the destination recurring bill payment feature of the destination online account system begin only when explicitly turned on by the user. In one embodiment, as a default, the recurring payments made through the source recurring bill payment feature of the source online account system are automatically terminated upon transfer of the user selected and/or edited data and the recurring payments to be made through the destination recurring bill payment feature of the destination online account system automatically begin upon transfer of the user selected and/or edited data.

In one embodiment, the process described above is repeated for one of more other "source" financial institutions currently associated with the user.

Using the process for transferring bill payment data as disclosed herein, a user can semi-automatically transfer bill payment, and/or recurring bill payment, data from one or more currently used financial institutions to a new financial institution and thereby avoid having to manually enter all the payee and/or recurring payment information for the new financial institution. Consequently, using the process for transferring bill payment data as disclosed herein, if a user determines that it would be to their benefit to switch financial intuitions, they can do so without having to worry about any data entry burden. As result, using the process for transferring bill payment data as disclosed herein, financial institutions will no longer be able to hold users hostage using the users' own data and the inertia of convenience.

In addition, as discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 3 is an exemplary screen display in accordance with one embodiment;

FIG. 4 is an exemplary screen display in accordance with one embodiment;

FIG. 6 is an exemplary screen display in accordance with one embodiment; and

FIG. 7 is an exemplary screen display in accordance with one embodiment.

Figure 1:
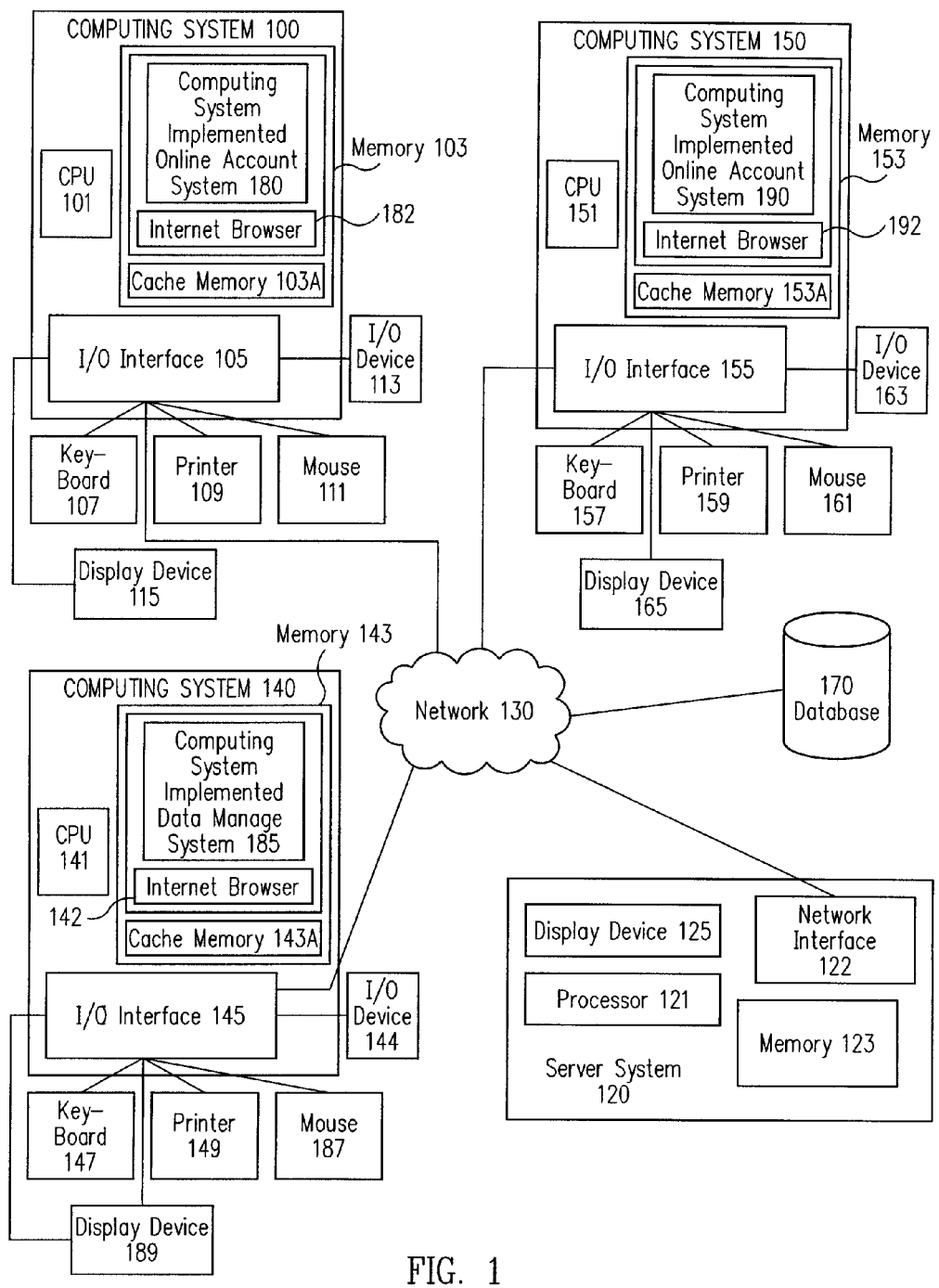
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for transferring bill payment data includes a process for transferring bill payment data whereby a user can transfer bill payment, and/or recurring bill payment, data from their current financial institution to a new financial institution without having to manually enter all the payee and/or recurring payment information for the new financial institution. In one embodiment, a user first identifies their current financial institution and provides authentication data associated with their current online account system. In one embodiment, the process for transferring bill payment data then accesses the current online account system using the user provided current online account system authentication data. In one embodiment, once the current online account system is accessed, data associated with the bill payment feature, and/or recurring bill payment feature, of the current online account system is obtained and/or copied, in one embodiment using screen scraping technology. In one embodiment, the data associated with the bill payment feature, and/or recurring bill payment feature, of the current online account system is displayed to the user and the user is provided the opportunity to select what portions of the data associated with the bill payment feature, and/or recurring bill payment feature, of the current online account system are to be transferred to a bill payment feature, and/or recurring bill payment feature, of the a new online account system sponsored, provided, and/or otherwise associated with the new financial institution. In one embodiment, the user is also provided the opportunity to edit and/or change the data associated with the bill payment feature, and/or recurring bill payment feature, of the current online account system that is to be transferred to the new bill payment feature, and/or recurring bill payment feature, of the new online account system. In one embodiment, the selected and/or edited data associated with the bill payment feature, and/or recurring bill payment feature, of the current online account system is then transferred to the bill payment feature, and/or recurring bill payment feature, of the new online account system. In one embodiment, the user is also provided the opportunity to select a date when recurring payments made through the recurring bill payment feature of the current online account system are to be terminated and/or taken over by the recurring bill payment feature of the new online account system.

FIG. 1 is a block diagram of an exemplary hardware architecture for implementing one embodiment of a system and method for transferring bill payment data, such as exemplary process 200 (FIG. 2) discussed herein, that, returning to FIG. 1, includes: a computing system 100, e.g., a source computing system; a computing system 150, e.g., a destination computing system; a computing system 140, e.g., a third computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented online account system 180, such as any computing system implemented online account system defined herein, known in the art at the time of filing, and/or as developed thereafter. In one embodiment, computing system implemented online account system 180 is stored, in whole, or in part, in memory system 103, and is used by, or includes, or is accessed by, a process for transferring bill payment data (not shown in FIG. 1, see FIG. 2).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for transferring bill payment data, and/or a computing system implemented online account system, are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that is stored, in whole, or in part in memory 103.

In one embodiment, data associated with a source financial institution, a source bill pay feature, a source recurring bill pay feature, and/or a user is stored, in whole, or in part, in memory system 103, and is used by, or is accessed by, a process for transferring bill payment data and/or one or more users. In one embodiment, computing system 100 is a computing system accessible by one or more users. In one embodiment, computing system 100 is used, and/or accessible, by another computing system, such as computing systems 150 and/or 140 (discussed below).

In one embodiment, computing system 100 is used, controlled, provided, and/or otherwise associated with, a source financial institution and data representing all, or part, of data associated with a source financial institution, a source bill pay feature, a source recurring bill pay feature, and/or a user, is stored in computing system 100.

Computing system 100 can be any computing system as defined herein and/or as known in the art at the time of filing and/or as developed thereafter, that includes components that can execute all, or part, of a process for transferring bill payment data, and/or a computing system implemented online account system, in accordance with at least one of the embodiments as described herein.

As also seen in FIG. 1, computing system 150 typically includes a central processing unit (CPU) 151, an input/output (I/O) interface 155, and a memory system 153, including cache memory 153A. In one embodiment, memory system 153 includes all, or part, of a computing system implemented online account system 190, such as any computing system implemented online account system defined herein, known in the art at the time of filing, and/or as developed thereafter. In one embodiment, computing system implemented online account system 190 is stored, in whole, or in part, in memory system 153, and is used by, or includes, or is accessed by, a process for transferring bill payment data (not shown in FIG. 1, see FIG. 2).

Returning to FIG. 1, computing system 150 may further include standard user interface devices such as a keyboard 157, a mouse 161, a printer 159, and a display device 165, as well as, one or more standard input/output (I/O) devices 163, such as a compact disk (CD) or Digital Video Disc (DVD) drive, floppy disk drive, or other digital or waveform port, or other device capable of inputting data to, and outputting data from, computing system 150, whether available or known at the time of filing or as later developed. As discussed in more detail below, in one embodiment, a process for transferring bill payment data, and/or a computing system implemented online account system, are entered, in whole, or in part, into computing system 150 via I/O device 163, such as from a CD, DVD, floppy disk, portable hard drive, memory stick, download site, or other medium and/or computer program product as defined herein.

In one embodiment, computing system 150 also includes an Internet browser capability 192 that is stored, in whole, or in part in memory 153.

In one embodiment, data associated with a destination financial institution, a destination bill pay feature, a destination recurring bill pay feature, and/or a user is stored, in whole, or in part, in memory system 153, and is used by, or is accessed by, a process for transferring bill payment data and/or one or more users. In one embodiment, computing system 150 is a computing system accessible by one or more users. In one embodiment, computing system 150 is used, and/or accessible, by another computing system, such as computing systems 100 and/or 140 (discussed below).

In one embodiment, computing system 150 is used, controlled, provided, and/or otherwise associated with, a destination financial institution and data representing all, or part, of data associated with a destination financial institution, a destination bill pay feature, a destination recurring bill pay feature, and/or a user, is stored in computing system 150.

Computing system 150 can be any computing system as defined herein and/or as known in the art at the time of filing and/or as developed thereafter, that includes components that can execute all, or part, of a process for transferring bill payment data, and/or a computing system implemented online account system, in accordance with at least one of the embodiments as described herein.

As also seen in FIG. 1, computing system 140 typically includes a central processing unit (CPU) 141, an input/output (I/O) interface 145, and a memory system 143, including cache memory 143A. In one embodiment, memory system 143 includes all, or part, of a computing system implemented data management system 185, such as any computing system implemented data management system defined herein, known in the art at the time of filing, and/or as developed thereafter. In one embodiment, computing system implemented data management system 185 is stored, in whole, or in part, in memory system 143, and is used by, or includes, or is accessed by, a process for transferring bill payment data (not shown in FIG. 1, see FIG. 2).

Returning to FIG. 1, computing system 140 may further include standard user interface devices such as a keyboard 147, a mouse 187, a printer 149, and a display device 189, as well as, one or more standard input/output (I/O) devices 144, such as a compact disk (CD) or Digital Video Disc (DVD) drive, floppy disk drive, or other digital or waveform port, or other device capable of inputting data to, and outputting data from, computing system 140, whether available or known at the time of filing or as later developed. As discussed in more detail below, in one embodiment, a process for transferring bill payment data, and/or a computing system implemented data management system, are entered, in whole, or in part, into computing system 140 via I/O device 144, such as from a CD, DVD, floppy disk, portable hard drive, memory stick, download site, or other medium and/or computer program product as defined herein.

In one embodiment, computing system 140 also includes an Internet browser capability 142 that is stored, in whole, or in part in memory 143.

In one embodiment, data associated with a process for transferring bill payment data and/or one or more users is stored, in whole, or in part, in memory system 143. In one embodiment, computing system 140 is a computing system accessible by one or more users. In one embodiment, computing system 140 uses, and/or accesses, another computing system, such as computing systems 150 and/or 100 and/or server system 120.

Computing system 140 can be any computing system as defined herein and/or as known in the art at the time of filing and/or as developed thereafter, that includes components that can execute all, or part, of a process for transferring bill payment data, and/or a computing system implemented data management system, in accordance with at least one of the embodiments as described herein.

Also shown in FIG. 1 is database 170. In one embodiment, database 170 is a data storage device, a designated server system or computing system, or a designated portion of one or more server systems or computing systems, such as computing systems 100, 140, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a process for transferring bill payment data, and/or a computing system implemented online account system and/or a computing system implemented data management system.

In one embodiment, data associated with one or more financial institutions, one or more bill pay features, one or more recurring bill pay features, and/or one or more users, is stored, in whole, or in part, in database 170, and is used by, or is accessed by, a process for transferring bill payment data. In one embodiment, database 170 is accessible by one or more users. In one embodiment, database 170 is used, and/or accessible, by a computing system, such as computing systems 100, 140, and/or 150, and/or a server system, such as sever system 120 (discussed below).

In one embodiment, database 170 is used, controlled, and/or accessible by, a provider of and/or a computing system implemented online account system and data representing all, or part, of data associated with one or more financial institutions, one or more bill pay features, one or more recurring bill pay features, and/or one or more users, is stored in database 170.

In one embodiment, computing systems 100, 140, and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a source computing system, such as computing system 100, and a destination computing system, such as computing system 150.

In one embodiment, data associated with one or more financial institutions, one or more bill pay features, one or more recurring bill pay features, and/or one or more users, is stored, in whole, or in part, in server system 120, and is used by, or is accessed by, a process for transferring bill payment data. In one embodiment, server system 120 is accessible by one or more users. In one embodiment, server system 120 is used, and/or accessible, by a computing system, such as computing systems 100, 140, and/or 150, and/or one or more databases, such as database 170.

In one embodiment, server system 120 is used, controlled, and/or accessible by, a provider of and/or a computing system implemented online account system and data representing all, or part, of data associated with one or more financial institutions, one or more bill pay features, one or more recurring bill pay features, and/or one or more users, is stored in server system 120.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100, 140, and 150, database 170, server system 120, and their respective components, are shown for illustrative purposes only and that architectures with more or fewer components can implement, and benefit from, one or more embodiments. Moreover, one or more components of computing system 100, computing system 140, computing system 150, database 170, and server system 120 may be located remotely from their respective system and accessed via network 130. In addition, the particular type of, and configuration of, computing systems 100, 140, and 150, database 170, and server system 120 are not relevant.

As discussed in more detail below, in one embodiment, a process for transferring bill payment data, and/or a computing system implemented online account system, and/or a computing system implemented data management system, and/or data associated with one or more financial institutions, one or more bill pay features, one or more recurring bill pay features, and/or one or more users, is stored, in whole, or in part, in memory system 103 and/or cache memory 103A, of computing system 100, in memory system 143 and/or cache memory 143A, of computing system 140, and/or memory system 153 and/or cache memory 153A of computing system 150, and/or in server memory system 123 of server system 120 and/or in database 170, and executed on computing system 100, and/or computing system 140, and/or computing system 150. As used herein, a memory refers to a volatile memory, a non-volatile memory, or any combination of the two.

Although a process for transferring bill payment data, and/or a computing system implemented online account system, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for transferring bill payment data, and/or a computing system implemented online account system, and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101, 141, and 150, or server system processor 121. In one embodiment, execution of a process by CPU 101, CPU 141, CPU 150, or server system processor 121, results in the operations of an agent computer process (not shown) and/or a rule computer process (not shown).

In one embodiment, a process for transferring bill payment data, and/or a computing system implemented online account system, and/or a computing system implemented data management system, and/or data associated with one or more financial institutions, one or more bill pay features, one or more recurring bill pay features, and/or one or more users, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "user" and "consumer" include any person, party, business, system, application, organization, and/or entity interacting with, interfacing with, contacting, viewing, accepting data from, requesting data from, and/or otherwise associating with the process for transferring bill payment data for any purpose.

Herein the term "financial institution" includes any entity, party, person, application and/or system, such as, but not limited to, banks, savings & loans, building societies, credit unions, credit card companies, stock brokerages, asset account companies, and/or investment firms, that engages in money/asset/debt management and/or financial transaction management/recording and/or display.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented financial management systems, packages, programs, modules, or applications; computing system implemented online systems, packages, programs, modules, or applications; computing system implemented account systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented accounting and/or invoicing systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filling or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a system and method for transferring bill payment data includes a process for transferring bill payment data whereby a user can transfer bill payment, and/or recurring bill payment, data from their current financial institution to a new financial institution without having to manually enter all the payee and/or recurring payment information for the new financial institution. In one embodiment, a user first identifies their current financial institution and provides authentication data associated with their current online account system. In one embodiment, the process for transferring bill payment data then accesses the current online account system using the user provided current online account system authentication data. In one embodiment, once the current online account system is accessed, data associated with the bill payment feature, and/or recurring bill payment feature, of the current online account system is obtained and/or copied, in one embodiment using screen scraping technology. In one embodiment, the data associated with the bill payment feature, and/or recurring bill payment feature, of the current online account system is displayed to the user and the user is provided the opportunity to select what portions of the data associated with the bill payment feature, and/or recurring bill payment feature, of the current online account system are to be transferred to a bill payment feature, and/or recurring bill payment feature, of the a new online account system sponsored, provided, and/or otherwise associated with the new financial institution. In one embodiment, the user is also provided the opportunity to edit and/or change the data associated with the bill payment feature, and/or recurring bill payment feature, of the current online account system that is to be transferred to the new bill payment feature, and/or recurring bill payment feature, of the new online account system. In one embodiment, the selected and/or edited data associated with the bill payment feature, and/or recurring bill payment feature, of the current online account system is then transferred to the bill payment feature, and/or recurring bill payment feature, of the new online account system. In one embodiment, the user is also provided the opportunity to select a date when recurring payments made through the recurring bill payment feature of the current online account system are to be terminated and/or taken over by the recurring bill payment feature of the new online account system.

Figure 2:
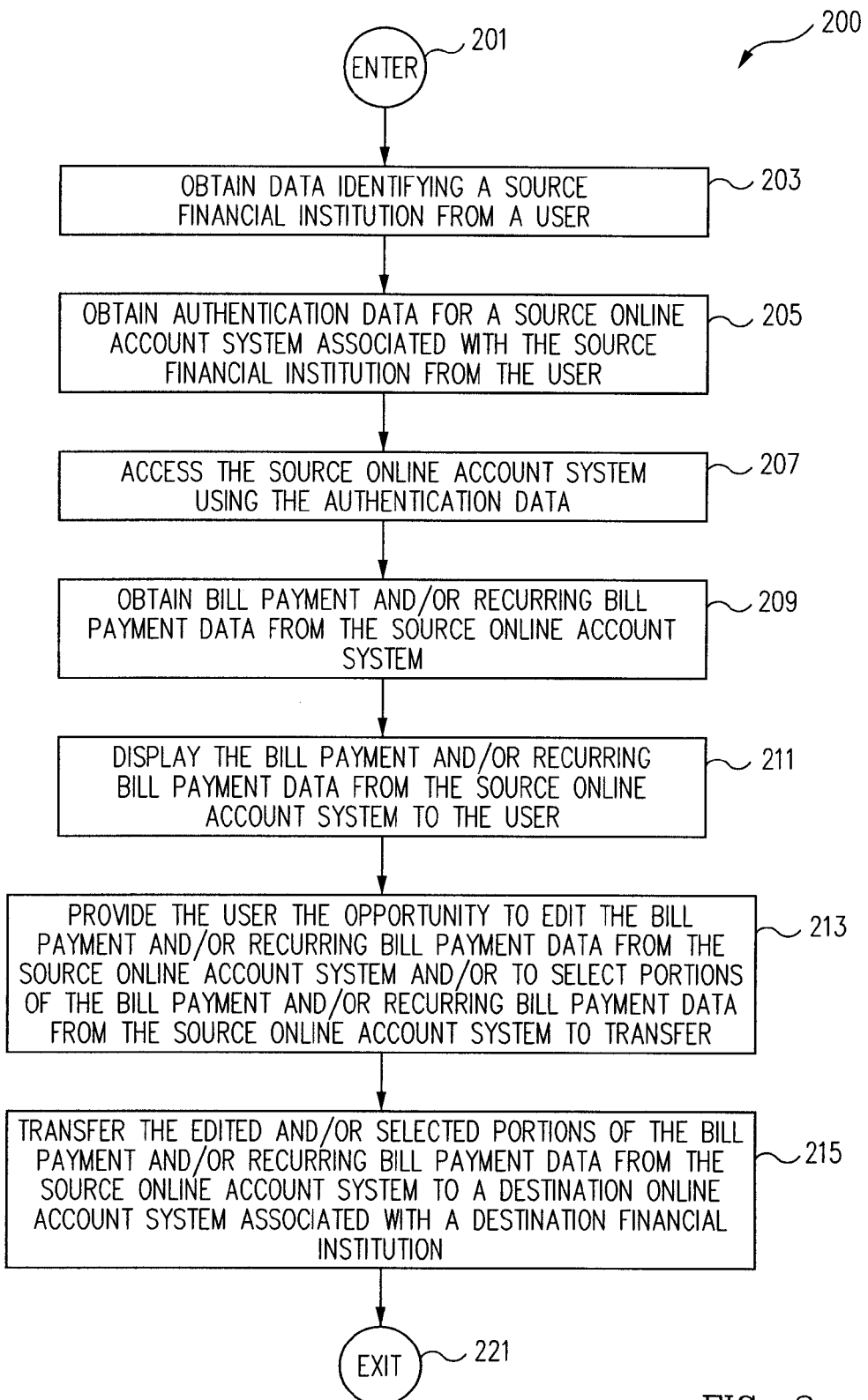
FIG. 2 is a flow chart depicting a process for transferring bill payment data in accordance with one embodiment.

FIG. 2 is a flow chart depicting a process for transferring bill payment data 200 in accordance with one embodiment. Process for transferring bill payment data 200 begins at ENTER OPERATION 201 and process flow proceeds to OBTAIN DATA IDENTIFYING A SOURCE FINANCIAL INSTITUTION FROM A USER OPERATION 203.

In one embodiment, at OBTAIN DATA IDENTIFYING A SOURCE FINANCIAL INSTITUTION FROM A USER OPERATION 203 a user identifies their current financial institution.

In one embodiment, at OBTAIN DATA IDENTIFYING A SOURCE FINANCIAL INSTITUTION FROM A USER OPERATION 203 the user identifies their current financial institution, herein also referred to as a source financial institution, which sponsors, provides, and/or is otherwise associated with, a source online account system, such as computing system implemented online account system 180 of FIG. 1, having a source bill pay and/or recurring bill pay feature to process for transferring bill payment data 200 (FIG. 2).

In one embodiment, the user identifies the source financial institution through a user interface screen displayed on a display device, such as display devices 115, 165, and/or 189 of FIG. 1, associated with a computing system, such as computing systems 100, 140 and/or 150, and a user interface device such as a mouse (111, 161, 187 In FIG. 1), and/or a keyboard (107, 147, 157 in FIG. 1), a touch screen, voice recognition software, or any other device and/or system for converting one or more user actions into computing system based instructions as discussed herein, and/or as known in the art at the time of filing, and/or as developed after the time of filing.

FIG. 3 shows an exemplary user interface screen display 300 used in accordance with one embodiment at OBTAIN DATA IDENTIFYING A SOURCE FINANCIAL INSTITUTION FROM A USER OPERATION 203. As seen in FIG. 3, exemplary user interface screen display 300 include data entry field 301 where a user enters the name of the source financial institution. In one embodiment, exemplary user interface screen display 300 includes a data entry field 301 that suggests possible financial institutions, as the user is typing in the name of the source financial institution, that match the portions of the source financial institution data, as they are being entered, in a drop down list, or menu, of possible financial institutions. In some embodiments, screen display 300 includes a list of financial institutions (not shown in FIG. 3) and the user selects the desired source financial institution from the list using the user interface device.

In one embodiment, once a user identifies their current financial institution, or the source financial institution, at OBTAIN DATA IDENTIFYING A SOURCE FINANCIAL INSTITUTION FROM A USER OPERATION 203 process flow proceeds to OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205.

In one embodiment, at OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205 the user provides source online account system authentication data associated with the source online account system of OBTAIN DATA IDENTIFYING A SOURCE FINANCIAL INSTITUTION FROM A USER OPERATION 203.

In one embodiment, at OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205 the user provides source online account system authentication data associated with the source online account system including, but not limited to: the user's ID with the source online account system; the user's password used with the source online account system; the user's account number with the source online account system; and/or any other authentication data associated the source online account system.

In one embodiment, at OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205 the user provides source online account system authentication data associated with the source online account system through a user interface screen displayed on a display device, such as display devices 115, 165, and/or 189 of FIG. 1, associated with a computing system, such as computing systems 100, 140 and/or 150, and a user interface device such as a mouse (111, 161, 187 In FIG. 1), and/or a keyboard (107, 147, 157 in FIG. 1), a touch screen, voice recognition software, or any other device and/or system for converting one or more user actions into computing system based instructions as discussed herein, and/or as known in the art at the time of filing, and/or as developed after the time of filing, desired and/or needed.

FIG. 4 shows an exemplary user interface screen display 400 used in accordance with one embodiment at OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205.

As seen in FIG. 4, exemplary user interface screen display 400 include data entry section 401 where a user enters, in this specific example, the user's ID with the source online account system identified in data entry field 301 of FIG. 3, and the user's password used with the source online account system.

Returning to FIG. 2, once the user provides source online account system authentication data associated with the source online account system of OBTAIN DATA IDENTIFYING A SOURCE FINANCIAL INSTITUTION FROM A USER OPERATION 203 at OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205, process flow proceeds to ACCESS THE SOURCE ONLINE ACCOUNT SYSTEM USING THE AUTHENTICATION DATA OPERATION 207.

In one embodiment, at ACCESS THE SOURCE ONLINE ACCOUNT SYSTEM USING THE AUTHENTICATION DATA OPERATION 207 process for transferring bill payment data 200 accesses the source online account system of OBTAIN DATA IDENTIFYING A SOURCE FINANCIAL INSTITUTION FROM A USER OPERATION 203 using the user provided source online account system authentication data of OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205.

In one embodiment, at ACCESS THE SOURCE ONLINE ACCOUNT SYSTEM USING THE AUTHENTICATION DATA OPERATION 207 process for transferring bill payment data 200 accesses the source online account system of OBTAIN DATA IDENTIFYING A SOURCE FINANCIAL INSTITUTION FROM A USER OPERATION 203 using the user provided source online account system authentication data of OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205 either directly, or through a computing system implemented data management system, such as computing system implemented data management system 185 of FIG. 1, that implements, includes, is accessible by, and/or is otherwise associated with, process for transferring bill payment data 200 (FIG. 2), and/or the user.

In one embodiment, at ACCESS THE SOURCE ONLINE ACCOUNT SYSTEM USING THE AUTHENTICATION DATA OPERATION 207 process for transferring bill payment data 200 accesses the source online account system of OBTAIN DATA IDENTIFYING A SOURCE FINANCIAL INSTITUTION FROM A USER OPERATION 203 using the user provided source online account system authentication data of OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205 by accessing one or more databases, such as database 170 of FIG. 1, one or more computing systems, such as computing systems 100 and/or 150 of FIG. 1, and/or one or more server systems, such as server system 120 of FIG. 1, or a web-site or other web-based system, and/or using a computer program product as defined herein.

Returning to FIG. 2, in one embodiment, at ACCESS THE SOURCE ONLINE ACCOUNT SYSTEM USING THE AUTHENTICATION DATA OPERATION 207 process for transferring bill payment data 200 accesses the source online account system of OBTAIN DATA IDENTIFYING A SOURCE FINANCIAL INSTITUTION FROM A USER OPERATION 203 using the user provided source online account system authentication data of OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205 through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1.

Returning to FIG. 2, in one embodiment, at ACCESS THE SOURCE ONLINE ACCOUNT SYSTEM USING THE AUTHENTICATION DATA OPERATION 207 process for transferring bill payment data 200 accesses the source online account system of OBTAIN DATA IDENTIFYING A SOURCE FINANCIAL INSTITUTION FROM A USER OPERATION 203 using the user provided source online account system authentication data of OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205 using any method, apparatus, process or mechanism for accessing data, images, screen displays, and/or text from one or more devices, computing systems, server systems, databases, web site/web functions and/or any systems and/or data, as discussed herein, and/or known in the art at the time of filing, and/or as developed after the time of filing.

In one embodiment, at ACCESS THE SOURCE ONLINE ACCOUNT SYSTEM USING THE AUTHENTICATION DATA OPERATION 207 process for transferring bill payment data 200 accesses the source online account system of OBTAIN DATA IDENTIFYING A SOURCE FINANCIAL INSTITUTION FROM A USER OPERATION 203 using the user provided source online account system authentication data of OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205 without the explicit permission, and/or knowledge of, the source financial institution of OBTAIN DATA IDENTIFYING A SOURCE FINANCIAL INSTITUTION FROM A USER OPERATION 203.

In one embodiment, at ACCESS THE SOURCE ONLINE ACCOUNT SYSTEM USING THE AUTHENTICATION DATA OPERATION 207 process for transferring bill payment data 200 accesses the source online account system of OBTAIN DATA IDENTIFYING A SOURCE FINANCIAL INSTITUTION FROM A USER OPERATION 203 using the user provided source online account system authentication data of OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205 with the explicit permission, and/or knowledge of, the source financial institution of OBTAIN DATA IDENTIFYING A SOURCE FINANCIAL INSTITUTION FROM A USER OPERATION 203.

In one embodiment, once process for transferring bill payment data 200 accesses the source online account system of OBTAIN DATA IDENTIFYING A SOURCE FINANCIAL INSTITUTION FROM A USER OPERATION 203 using the user provided source online account system authentication data of OBTAIN AUTHENTICATION DATA FOR A SOURCE ONLINE ACCOUNT SYSTEM ASSOCIATED WITH THE SOURCE FINANCIAL INSTITUTION FROM THE USER OPERATION 205, process flow proceeds to OBTAIN BILL PAYMENT AND/OR RECURRING BILL PAYMENT DATA FROM THE SOURCE ONLINE ACCOUNT SYSTEM OPERATION 209.

In one embodiment, at OBTAIN BILL PAYMENT AND/OR RECURRING BILL PAYMENT DATA FROM THE SOURCE ONLINE ACCOUNT SYSTEM OPERATION 209 once the source online account system is accessed at ACCESS THE SOURCE ONLINE ACCOUNT SYSTEM USING THE AUTHENTICATION DATA OPERATION 207, data associated with the source bill payment feature, and/or recurring bill payment feature, of the source online account system of OBTAIN DATA IDENTIFYING A SOURCE FINANCIAL INSTITUTION FROM A USER OPERATION 203, is obtained and/or copied by process for transferring bill payment data 200.

In one embodiment, at OBTAIN BILL PAYMENT AND/OR RECURRING BILL PAYMENT DATA FROM THE SOURCE ONLINE ACCOUNT SYSTEM OPERATION 209, the data associated with the source bill payment feature, and/or recurring bill payment feature, of the source online account system of OBTAIN DATA IDENTIFYING A SOURCE FINANCIAL INSTITUTION FROM A USER OPERATION 203 includes, but is not limited to: one or more payee names; the payee addresses associated with the one or more payees; the user's account numbers associated with the one or more payees; user nicknames associated with the one or more payees; recurring payment amounts, if any, associated with the one or more payees; recurring payment frequencies, if any, associated with the one or more payees; beginning and ending dates for recurring payment plans, if any, associated with the one or more payees; and/or any other data associated with the source bill payment feature, and/or recurring bill payment feature, of the source online account system desired.

In short, in one embodiment, all, or part of, the data associated with the source bill payment feature, and/or recurring bill payment feature, of the source online account system of OBTAIN DATA IDENTIFYING A SOURCE FINANCIAL INSTITUTION FROM A USER OPERATION 203 that would, absent process for transferring bill payment data 200, have to be manually entered by the user in a destination bill payment feature, and/or recurring bill payment feature, of a new, or destination, online account system after a switch of financial systems is obtained and/or copied by process for transferring bill payment data 200 at OBTAIN BILL PAYMENT AND/OR RECURRING BILL PAYMENT DATA FROM THE SOURCE ONLINE ACCOUNT SYSTEM OPERATION 209.

In one embodiment, at OBTAIN BILL PAYMENT AND/OR RECURRING BILL PAYMENT DATA FROM THE SOURCE ONLINE ACCOUNT SYSTEM OPERATION 209, the data associated with the source bill payment feature, and/or recurring bill payment feature, of the source online account system of OBTAIN DATA IDENTIFYING A SOURCE FINANCIAL INSTITUTION FROM A USER OPERATION 203 is obtained by process for transferring bill payment data 200 with the explicit permission, and/or knowledge of, the source financial institution of OBTAIN DATA IDENTIFYING A SOURCE FINANCIAL INSTITUTION FROM A USER OPERATION 203.

In one embodiment, at OBTAIN BILL PAYMENT AND/OR RECURRING BILL PAYMENT DATA FROM THE SOURCE ONLINE ACCOUNT SYSTEM OPERATION 209, the data associated with the source bill payment feature, and/or recurring bill payment feature, of the source online account system of OBTAIN DATA IDENTIFYING A SOURCE FINANCIAL INSTITUTION FROM A USER OPERATION 203 is obtained by process for transferring bill payment data 200 without the explicit permission, and/or knowledge of, the source financial institution of OBTAIN DATA IDENTIFYING A SOURCE FINANCIAL INSTITUTION FROM A USER OPERATION 203.

In one embodiment, at OBTAIN BILL PAYMENT AND/OR RECURRING BILL PAYMENT DATA FROM THE SOURCE ONLINE ACCOUNT SYSTEM OPERATION 209, the data associated with the source bill payment feature, and/or recurring bill payment feature, of the source online account system of OBTAIN DATA IDENTIFYING A SOURCE FINANCIAL INSTITUTION FROM A USER OPERATION 203 is obtained by process for transferring bill payment data 200 using screen scraping technology and/or any similar technology as discussed herein, and/or known in the art at the time of filing, and/or as developed after the time of filing.

Numerous methods, means, processes, and procedures are known in the art, and used in the art, for screen scraping data from one or more display screens and/or other sources. Consequently, a more detailed discussion of the specific methods, means, processes, and procedures for, in some embodiments, screen scraping the data associated with the source bill payment feature, and/or recurring bill payment feature, of the source online account system of OBTAIN DATA IDENTIFYING A SOURCE FINANCIAL INSTITUTION FROM A USER OPERATION 203 at OBTAIN BILL PAYMENT AND/OR RECURRING BILL PAYMENT DATA FROM THE SOURCE ONLINE ACCOUNT SYSTEM OPERATION 209 is omitted here to avoid detracting from the invention.

In one embodiment, once data associated with the source bill payment feature, and/or recurring bill payment feature, of the source online account system of OBTAIN DATA IDENTIFYING A SOURCE FINANCIAL INSTITUTION FROM A USER OPERATION 203, is obtained and/or copied by process for transferring bill payment data 200 at OBTAIN BILL PAYMENT AND/OR RECURRING BILL PAYMENT DATA FROM THE SOURCE ONLINE ACCOUNT SYSTEM OPERATION 209, process flow proceeds to DISPLAY THE BILL PAYMENT AND/OR RECURRING BILL PAYMENT DATA FROM THE SOURCE ONLINE ACCOUNT SYSTEM TO THE USER OPERATION 211.

In one embodiment, at DISPLAY THE BILL PAYMENT AND/OR RECURRING BILL PAYMENT DATA FROM THE SOURCE ONLINE ACCOUNT SYSTEM TO THE USER OPERATION 211 the data associated with the source bill payment feature, and/or recurring bill payment feature, of the source online account system of OBTAIN BILL PAYMENT AND/OR RECURRING BILL PAYMENT DATA FROM THE SOURCE ONLINE ACCOUNT SYSTEM OPERATION 209 is displayed to the user by process for transferring bill payment data 200.

In one embodiment, at DISPLAY THE BILL PAYMENT AND/OR RECURRING BILL PAYMENT DATA FROM THE SOURCE ONLINE ACCOUNT SYSTEM TO THE USER OPERATION 211 the data associated with the source bill payment feature, and/or recurring bill payment feature, of the source online account system of OBTAIN BILL PAYMENT AND/OR RECURRING BILL PAYMENT DATA FROM THE SOURCE ONLINE ACCOUNT SYSTEM OPERATION 209 is displayed to the user by process for transferring bill payment data 200 through a user interface screen displayed on a display device, such as display devices 115, 165, and/or 189 of FIG. 1, associated with a computing system, such as computing systems 100, 140 and/or 150.

In one embodiment, at DISPLAY THE BILL PAYMENT AND/OR RECURRING BILL PAYMENT DATA FROM THE SOURCE ONLINE ACCOUNT SYSTEM TO THE USER OPERATION 211 the data associated with the source bill payment feature, and/or recurring bill payment feature, of the source online account system of OBTAIN BILL PAYMENT AND/OR RECURRING BILL PAYMENT DATA FROM THE SOURCE ONLINE ACCOUNT SYSTEM OPERATION 209 is displayed to the user as a listing of bill payment payees and the associated payees' information, and/or associated recurring payments, if any.

Figure 5:
FIG. 5 is an exemplary screen display in accordance with one embodiment.

FIG. 5 shows an exemplary user interface screen display 500 used in accordance with one embodiment at DISPLAY THE BILL PAYMENT AND/OR RECURRING BILL PAYMENT DATA FROM THE SOURCE ONLINE ACCOUNT SYSTEM TO THE USER OPERATION 211 (FIG. 2).

As seen in FIG. 5, exemplary user interface screen display 500 includes bill payment payees and the associated payees' information listing 501, including payee information listings 503 and 505. As also seen in FIG. 5, each payee information listing, such as payee information listings 503 and 505 includes, in this specific example, the payee name, the payee nickname, the user's account number with the associated payee, the last payment made to the associated payee amount, and the date when the last payment was made to the associated payee.

In one embodiment, once the data associated with the source bill payment feature, and/or recurring bill payment feature, of the source online account system of OBTAIN BILL PAYMENT AND/OR RECURRING BILL PAYMENT DATA FROM THE SOURCE ONLINE ACCOUNT SYSTEM OPERATION 209 is displayed to the user at DISPLAY THE BILL PAYMENT AND/OR RECURRING BILL PAYMENT DATA FROM THE SOURCE ONLINE ACCOUNT SYSTEM TO THE USER OPERATION 211 process flow proceeds to PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213.

In one embodiment, at PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213, the user is provided the opportunity to select what portions of the data associated with the source bill payment feature, and/or recurring bill payment feature, of the source online account system are to be transferred to a destination bill payment feature, and/or recurring bill payment feature, of a destination online account system sponsored, provided, and/or otherwise associated with the destination financial institution.

In addition, in one embodiment, at PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 the user is provided the opportunity to edit the data associated with the source bill payment feature, and/or recurring bill payment feature, of the source online account system of DISPLAY THE BILL PAYMENT AND/OR RECURRING BILL PAYMENT DATA FROM THE SOURCE ONLINE ACCOUNT SYSTEM TO THE USER OPERATION 211 that is to be transferred to the destination bill payment feature, and/or recurring bill payment feature, of the destination online account system.

In one embodiment, at PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 the user individually selects, or de-selects, which bill payment payees and the associated payee information and/or associated recurring payments are to be transferred from a listing of bill payment payees and the associated payee information and/or associated recurring payments.

In one embodiment, at PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 the user selects what portions of the data associated with the source bill payment feature, and/or recurring bill payment feature, of the source online account system are to be transferred through a user interface screen displayed on a display device, such as display devices 115, 165, and/or 189 of FIG. 1, associated with a computing system, such as computing systems 100, 140 and/or 150, and a user interface device such as a mouse (111, 161, 187 In FIG. 1), and/or a keyboard (107, 147, 157 in FIG. 1), a touch screen, voice recognition software, or any other device and/or system for converting one or more user actions into computing system based instructions as discussed herein, and/or as known in the art at the time of filing, and/or as developed after the time of filing.

Returning to FIG. 5, recall FIG. 5 shows an exemplary user interface screen display 500 used in accordance with one embodiment at DISPLAY THE BILL PAYMENT AND/OR RECURRING BILL PAYMENT DATA FROM THE SOURCE ONLINE ACCOUNT SYSTEM TO THE USER OPERATION 211 and PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 (FIG. 2).

As seen in FIG. 5, and as discussed above, exemplary user interface screen display 500 includes bill payment payees and the associated payees' information listing 501, including, payee information for each listing, such as payee information listings 503 and 505 including, in this specific example, the payee name, the payee nickname, the user's account number with the associated payee, the last payment made to the associated payee amount, and the date when the last payment was made to the associated payee.

As also seen in FIG. 5, exemplary user interface screen display 500 includes selection column 511 that, in this example, is a column of check boxes, one each associated with each payee information listing in payees' information listing 501, such as payee information listings 503 and 505. In one embodiment, a user selects a given payee information listing in payees' information listing 501, such as payee information listings 503 and 505, for transfer by selecting, in this instance placing a check mark in the associated checkbox, the desired payee information listing in payees' information listing 501. In the specific example of FIG. 5, payee information listing 503 has not been selected for transfer, as indicated by the lack of a check mark in the check box of selection column 511 associated with payee information listing 503. On the other hand, in the specific example of FIG. 5, payee information listing 505 has been selected for transfer, as indicated by the presence of a check mark in the check box of selection column 511 associated with payee information listing 505.

As noted above, in one embodiment, at PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 the user is provided the opportunity to edit the data associated with the source bill payment feature, and/or recurring bill payment feature, of the source online account system that is to be transferred to the destination bill payment feature, and/or recurring bill payment feature, of the destination online account system.

In one embodiment, at PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 the user is provided the opportunity to edit the data associated with the source bill payment feature, and/or recurring bill payment feature, of the source online account system that is to be transferred to the destination bill payment feature, and/or recurring bill payment feature, of the destination online account system through a user interface screen displayed on a display device, such as display devices 115, 165, and/or 189 of FIG. 1, associated with a computing system, such as computing systems 100, 140 and/or 150, and a user interface device such as a mouse (111, 161, 187 In FIG. 1), and/or a keyboard (107, 147, 157 in FIG. 1), a touch screen, voice recognition software, or any other device and/or system for converting one or more user actions into computing system based instructions as discussed herein, and/or as known in the art at the time of filing, and/or as developed after the time of filing.

FIG. 6 shows an exemplary user interface screen display 600 used in accordance with one embodiment at PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213.

As seen in FIG. 6, exemplary user interface screen display 600 includes editable data entry section 601 where a user can edit and/or add, and/or remove, virtually any data associated with a payee obtained/copied from the source bill payment feature, and/or recurring bill payment feature, of the source online account system that is to be transferred to the destination bill payment feature, and/or recurring bill payment feature, of the destination online account system. In addition, in one embodiment, exemplary user interface screen display 600 is presented to the user when necessary payee information is deemed to be missing, and/or incorrect, by process for transferring bill payment data 200.

In one embodiment, once the user is provided the opportunity to select what portions of the data associated with the source bill payment feature, and/or recurring bill payment feature, of the source online account system of DISPLAY THE BILL PAYMENT AND/OR RECURRING BILL PAYMENT DATA FROM THE SOURCE ONLINE ACCOUNT SYSTEM TO THE USER OPERATION 211 are to be transferred to a destination bill payment feature, and/or recurring bill payment feature, of a destination online account system sponsored, provided, and/or otherwise associated with the destination financial institution, and/or edit the data of DISPLAY THE BILL PAYMENT AND/OR RECURRING BILL PAYMENT DATA FROM THE SOURCE ONLINE ACCOUNT SYSTEM TO THE USER OPERATION 211 at PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213, process flow proceeds to TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215.

In one embodiment, at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 the user selected and/or edited data associated with the source bill payment feature, and/or recurring bill payment feature, of the source online account system of PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 is transferred to a destination bill payment feature, and/or recurring bill payment feature, of a destination online account system, provided by, sponsored by, and/or otherwise associated with, a destination financial institution.

In one embodiment, at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 the user selected and/or edited data associated with the source bill payment feature, and/or recurring bill payment feature, of the source online account system of PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 is transferred to a destination bill payment feature, and/or recurring bill payment feature, of a destination online account system either directly, or through a computing system implemented data management system, such as computing system implemented data management system 185 of FIG. 1, that implements, includes, is accessible by, and/or is otherwise associated with, process for transferring bill payment data 200 (FIG. 2).

In one embodiment, at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 the user selected and/or edited data associated with the source bill payment feature, and/or recurring bill payment feature, of the source online account system of PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 is transferred to a destination bill payment feature, and/or recurring bill payment feature, of a destination online account system by accessing one or more databases, such as database 170 of FIG. 1, one or more computing systems, such as computing systems 100, 140, and/or 150 of FIG. 1, and/or one or more server systems, such as server system 120 of FIG. 1, or a web-site or other web-based system, and/or using a computer program product as defined herein.

Returning to FIG. 2, in one embodiment, at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 the user selected and/or edited data associated with the source bill payment feature, and/or recurring bill payment feature, of the source online account system of PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 is transferred to a destination bill payment feature, and/or recurring bill payment feature, of a destination online account system through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1.

Returning to FIG. 2, in one embodiment, at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 the user selected and/or edited data associated with the source bill payment feature, and/or recurring bill payment feature, of the source online account system of PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 is transferred to a destination bill payment feature, and/or recurring bill payment feature, of a destination online account system using any method, apparatus, process or mechanism for accessing and/or transferring data, images, screen displays, and/or text from one or more devices, computing systems, server systems, databases, web site/web functions and/or any systems and/or data, as discussed herein, and/or known in the art at the time of filing, and/or as developed after the time of filing.

In one embodiment, at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 the user selected and/or edited data associated with the source bill payment feature, and/or recurring bill payment feature, of the source online account system of PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 transferred to a destination bill payment feature, and/or recurring bill payment feature, of a destination online account system and is incorporated with, and/or be used by, a destination bill payment feature, and/or recurring bill payment feature.

In one embodiment, at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 the user selected and/or edited data associated with the source bill payment feature, and/or recurring bill payment feature, of the source online account system of PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 is transferred to a destination bill payment feature, and/or recurring bill payment feature, of the destination online account system with the explicit permission, and/or knowledge of, the destination financial institution.

In one embodiment, at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 the user selected and/or edited data associated with the source bill payment feature, and/or recurring bill payment feature, of the source online account system of PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 is transferred to a destination bill payment feature, and/or recurring bill payment feature, of the destination online account system without the explicit permission, and/or knowledge of, the destination financial institution.

In one embodiment, at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 the user selected and/or edited data associated with the source bill payment feature, and/or recurring bill payment feature, of the source online account system of PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 is reviewed, and/or edited, by the user after being transferred to a destination bill payment feature, and/or recurring bill payment feature, of the destination online account system.

In one embodiment, at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 the user selected and/or edited data associated with the source bill payment feature, and/or recurring bill payment feature, of the source online account system of PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 is reviewed, and/or edited, by the user after being transferred to a destination bill payment feature, and/or recurring bill payment feature, of the destination online account system through a user interface screen displayed on a display device, such as display devices 115, 165, and/or 189 of FIG. 1, associated with a computing system, such as computing systems 100, 140 and/or 150, and/or a user interface device such as, a mouse (111, 161, 187 In FIG. 1), and/or a keyboard (107, 147, 157 in FIG. 1), a touch screen, voice recognition software, or any other device and/or system for converting one or more user actions into computing system based instructions as discussed herein, and/or as known in the art at the time of filing, and/or as developed after the time of filing.

FIG. 7 shows an exemplary user interface screen display 700 used in accordance with one embodiment at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215.

As seen in FIG. 7, exemplary user interface screen display 700 shows similar payee information in payee information listing 701 to that shown in exemplary user interface screen display 500 of FIG. 5. However, exemplary user interface screen display 700 of FIG. 7 shows the "switched" status of the user selected and/or edited data associated with the source bill payment feature, and/or recurring bill payment feature, of the source online account system of PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 that was transferred to a destination bill payment feature, and/or recurring bill payment feature, of the destination online account system at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215.

In one embodiment, at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 the user is provided the opportunity to select a date when the recurring payments made through the source recurring bill payment feature of the source online account system of ACCESS THE SOURCE ONLINE ACCOUNT SYSTEM USING THE AUTHENTICATION DATA OPERATION 207 are to be terminated.

In one embodiment, at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 the user is provided the opportunity to select a date when the recurring payments to be made through the destination recurring bill payment feature of the destination online account system of TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 are to begin.

In one embodiment, at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 as a default, the recurring payments made through the source recurring bill payment feature of the source online account system of OBTAIN DATA IDENTIFYING A SOURCE FINANCIAL INSTITUTION FROM A USER OPERATION 203 are left in place until explicitly terminated by the user and the recurring payments to be made through the destination recurring bill payment feature of the destination online account system of TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 begin only when explicitly turned on by the user.

In one embodiment, as a default, the recurring payments made through the source recurring bill payment feature of the source online account system of OBTAIN DATA IDENTIFYING A SOURCE FINANCIAL INSTITUTION FROM A USER OPERATION 203 are automatically terminated upon transfer of the user selected and/or edited data of TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 and the recurring payments to be made through the destination recurring bill payment feature of the destination online account system of TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215 automatically begin upon transfer of the user selected and/or edited data.

In one embodiment, once the user selected and/or edited data associated with the source bill payment feature, and/or recurring bill payment feature, of the source online account system of PROVIDE THE USER THE OPPORTUNITY TO EDIT THE BILL PAYMENT AND/OR RECURRING BILL PAYMENT DATA FROM THE SOURCE ONLINE ACCOUNT SYSTEM AND/OR TO SELECT PORTIONS OF THE BILL PAYMENT AND/OR RECURRING BILL PAYMENT DATA FROM THE SOURCE ONLINE ACCOUNT SYSTEM TO TRANSFER OPERATION 213 is transferred to a destination bill payment feature, and/or recurring bill payment feature, of a destination online account system, provided by, sponsored by, and/or otherwise associated with, a destination financial institution at TRANSFER THE EDITED AND/OR SELECTED PORTIONS OF THE BILL PAYMENT AND/OR RECURRING BILL PAYMENT DATA FROM THE SOURCE ONLINE ACCOUNT SYSTEM TO A DESTINATION ONLINE ACCOUNT SYSTEM ASSOCIATED WITH A DESTINATION FINANCIAL INSTITUTION OPERATION 215, process flow proceeds to EXIT OPERATION 221.

In one embodiment, at EXIT OPERATION 221 process for transferring bill payment data 200 is exited to await new data.

In one embodiment, process for transferring bill payment data 200 is repeated for one of more other current, or "source", financial institutions associated with the user.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for transferring bill payment data 200, a user can semi-automatically transfer bill payment, and/or recurring bill payment, data from one or more currently used financial institutions to a new financial institution and thereby avoid having to manually enter all the payee and/or recurring payment information for the new financial institution. Consequently, using process for transferring bill payment data 200, if a user determines that it would be to their benefit to switch financial intuitions, they can do so without having to worry about any data entry burden. As result, using process for transferring bill payment data 200, financial institutions will no longer be able to hold users hostage using the users' own data and the inertia of convenience.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein is merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining" "storing", "providing", "accessing", "displaying", "transferring", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for transferring bill payment data, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for transferring bill payment data comprising:
   obtaining, at a first computing system, data identifying a source financial institution, the source financial institution having bill payment or recurring bill payment data stored therein, the bill payment or recurring bill payment data being associated specifically with a source financial institution account of an account owner;
   obtaining authentication data for the source financial institution account associated with the account owner in a source online account system associated with the source financial institution, the source online account system being operable on a second computing system associated with the source financial institution, the second computing system being different from the first computing system;
   obtaining, from the source financial institution by the first computing system, the bill payment or recurring bill payment data associated with the account owner from the source financial institution account associated with the account owner in a source online account system, resulting in obtained bill payment data, the obtained bill payment data including at least a frequency of a recurring payment associated with at least one payee and further including at least one nickname associated with at least one payee;
   receiving, at the first computing system, after the bill payment data has been obtained, and prior to a transfer of edited bill payment data to a destination online system, at least one change to the obtained bill payment data, the at least one change being received as a result of input from the account owner, the changed bill payment data resulting in edited bill payment data;
   transferring, from the first computing system to the destination online account system, the edited bill payment data including at least a frequency of a recurring payment associated with at least one payee to a bill payment or recurring bill payment feature in an account associated with the account owner in the destination online account system, the destination online account system being associated with a destination financial institution, the destination financial institution being different from the source financial institution.

2. The computing system implemented process for transferring bill payment data of claim 1, wherein:

the authentication data for the account associated with the account owner in the source online account system associated with the source financial institution is obtained from the account owner and includes authentication data for the account associated with the account owner in the source online account system selected from at least one of the group of authentication data consisting of:
an account owner identification used by the account owner with the source online account system;
an account owner password used by the account owner with the source online account system; and
an account number associated with the account owner in the source online account system; and
additional authentication data associated with the account owner and/or account.

3. The computing system implemented process for transferring bill payment data of claim 1, wherein:
the account associated with the account owner in the source online account system is accessed without the permission of the source financial institution.

4. The computing system implemented process for transferring bill payment data of claim 1, wherein:
the account associated with the account owner in the source online account system is accessed with the permission of the source financial institution.

5. The computing system implemented process for transferring bill payment data of claim 1, wherein:
the bill payment or recurring bill payment data associated with the account owner from the account associated with the account owner in the source online account system includes one or more of bill payment or recurring bill payment data selected from at least one of the group of bill payment or recurring bill payment data consisting of:
one or more payee names;
addresses associated with the one or more payees;
the account owner's account numbers associated with one or more payees;
nicknames associated with one or more payees;
recurring payment amounts, if any, associated with one or more payees;
recurring payment frequencies, if any, associated with one or more payees; and
beginning and ending dates for recurring payment plans, if any, associated with one or more payees.

6. The computing system implemented process for transferring bill payment data of claim 1, wherein:
the bill payment or recurring bill payment data associated with the account owner from the account associated with the account owner in the source online account system is obtained with the permission of the source financial institution.

7. The computing system implemented process for transferring bill payment data of claim 1, wherein:
the bill payment or recurring bill payment data associated with the account owner from the account associated with the account owner in the source online account system is obtained without the permission of the source financial institution.

8. The computing system implemented process for transferring bill payment data of claim 1, wherein:
the bill payment or recurring bill payment data associated with the account owner from the account associated with the account owner in the source online account system is obtained from one or more display screens of the source online account system using screen scraping technology.

9. The computing system implemented process for transferring bill payment data of claim 1, wherein:
the bill payment or recurring bill payment data associated with the account owner from the account associated with the account owner in the source online account system is transferred to the bill payment or recurring bill payment feature in the account associated with the account owner in the destination online account system with the permission of the destination financial institution.

10. The computing system implemented process for transferring bill payment data of claim 1, wherein:
the at least part of the bill payment or recurring bill payment data associated with the account owner from the account associated with the account owner in the source online account system is transferred to the bill payment or recurring bill payment feature in the account associated with the account owner in the destination online account system without the permission of the destination financial institution.

11. The computing system implemented process for transferring bill payment data of claim 1, further comprising:
receiving, at the first computing system from the user, a selection of a subset of the obtained bill payment information to transfer to the bill payment or recurring bill payment feature in the account associated with the account owner in the destination online account system.

12. A computer program product for transferring bill payment data comprising:
a nontransitory computer readable medium;
and computer program code, encoded on the computer readable medium, comprising the following of which when a plurality are each executed by a set of one or more processors perform a process comprising:
obtaining, at a first computing system, data identifying a source financial institution, the source financial institution having bill payment or recurring bill payment data stored therein, the bill payment or recurring bill payment data being associated specifically with a source financial institution account of an account owner;
obtaining authentication data for the source financial institution account associated with the account owner the source online account system being operable on a second computing system associated with the source financial institution, the second computing system being different from the first computing system;
obtaining, from the source financial institution by the first computing system, the bill payment or recurring bill payment data associated with the account owner from the source financial institution account associated with the account owner in a source online account system, resulting in obtained bill payment data, the obtained bill payment data including at least a frequency of a recurring payment associated with at least one payee and further including at least one nickname associated with at least one payee;
receiving, at the first computing system, after the bill payment data has been obtained, and prior to a transfer of edited bill payment data to a destination online system, at least one change to the obtained bill payment data, the at least one change being received as a result of input from the account owner, the changed bill payment data resulting in edited bill payment data;
transferring, from the first computing system to the destination online account system, the edited bill payment data including at least a frequency of a recurring payment associated with at least one payee to a bill payment or recurring bill payment feature in an account associated with the account owner in the destination online account system, the destination online account system being associated with a destination financial institution, the destination financial institution being different from the source financial institution.

13. The computer program product for transferring bill payment data of claim 12, wherein:
the authentication data for the account associated with the account owner in the source online account system associated with the source financial institution is obtained from the account owner and includes authentication data for the account associated with the account owner in the source online account system selected from at least one of the group of authentication data consisting of:
an account owner identification used by the account owner with the source online account system;
an account owner password used by the account owner with the source online account system; and
an account number associated with the account owner in the source online account system; and
additional authentication data associated with the account owner and/or account.

14. The computer program product for transferring bill payment data of claim 12, wherein:
the account associated with the account owner in the source online account system is accessed without the permission of the source financial institution.

15. The computer program product for transferring bill payment data of claim 12, wherein:
the account associated with the account owner in the source online account system is accessed with the permission of the source financial institution.

16. The computer program product for transferring bill payment data of claim 12, wherein:
the bill payment or recurring bill payment data associated with the account owner from the account associated with the account owner in the source online account system includes one or more of bill payment or recurring bill payment data selected from at least one of the group of bill payment or recurring bill payment data consisting of:
one or more payee names;
addresses associated with the one or more payees;
the account owner's account numbers associated with one or more payees;
nicknames associated with one or more payees;
recurring payment amounts, if any, associated with one or more payees;
recurring payment frequencies, if any, associated with one or more payees; and
beginning and ending dates for recurring payment plans, if any, associated with one or more payees.

17. The computer program product for transferring bill payment data of claim 12, wherein:
the bill payment or recurring bill payment data associated with the account owner from the account associated with the account owner in the source online account system is obtained with the permission of the source financial institution.

18. The computer program product for transferring bill payment data of claim 12, wherein:
the bill payment or recurring bill payment data associated with the account owner from the account associated with the account owner in the source online account system is obtained without the permission of the source financial institution.

19. The computer program product for transferring bill payment data of claim 12, wherein:
the bill payment or recurring bill payment data associated with the account owner from the account associated with the account owner in the source online account system is obtained from one or more display screens of the source online account system using screen scraping technology.

20. The computer program product for transferring bill payment data of claim 12, wherein:
the at least part of the bill payment or recurring bill payment data associated with the account owner from the account associated with the account owner in the source online account system is transferred to the bill payment or recurring bill payment feature in the account associated with the account owner in the destination online account system with the permission of the destination financial institution.

21. The computer program product for transferring bill payment data of claim 12, wherein:
the at least part of the bill payment or recurring bill payment data associated with the account owner from the account associated with the account owner in the source online account system is transferred to the bill payment or recurring bill payment feature in the account associated with the account owner in the destination online account system without the permission of the destination financial institution.

* * * * *